United States Patent
Joseph et al.

(10) Patent No.: US 10,148,716 B1
(45) Date of Patent: *Dec. 4, 2018

(54) DYNAMIC GENERATION OF VIDEO MANIFEST FILES

(71) Applicant: Conviva Inc., San Mateo, CA (US)

(72) Inventors: Dilip Antony Joseph, Union City, CA (US); Aditya R. Ganjam, Mountain View, CA (US); Faisal Zakaria Siddiqi, San Jose, CA (US)

(73) Assignee: Conviva Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/859,702

(22) Filed: Apr. 9, 2013

Related U.S. Application Data (60) Provisional application No. 61/621,973, filed on Apr. 9, 2012.

(51) Int. Cl.
*G06F 15/16* (2006.01)
*H04L 29/06* (2006.01)

(52) U.S. Cl.
CPC .................. *H04L 65/60* (2013.01)

(58) Field of Classification Search
CPC ............ H04W 28/22; G11B 20/0527; H04N 21/2343; H04N 21/8549; H04L 67/02; H04L 65/607
See application file for complete search history.

(56) References Cited

U.S. PATENT DOCUMENTS

| | | | |
|---|---|---|---|
| 5,926,204 A | 7/1999 | Mayer |
| 5,930,473 A | 7/1999 | Teng |
| 5,987,621 A | 11/1999 | Duso |
| 6,006,264 A | 12/1999 | Colby |
| 6,026,077 A | 2/2000 | Iwata |
| 6,208,977 B1 | 3/2001 | Hernandez |
| 6,223,206 B1 | 4/2001 | Dan |
| 6,279,039 B1 | 8/2001 | Bhat |
| 6,324,565 B1 | 11/2001 | Holt, III |
| 6,405,251 B1 | 6/2002 | Bullard |
| 6,438,592 B1 | 8/2002 | Killian |
| 6,469,991 B1 | 10/2002 | Chuah |
| 6,470,389 B1 | 10/2002 | Chung |
| 6,711,622 B1 | 3/2004 | Fuller |
| 6,735,630 B1 | 5/2004 | Gelvin |
| 6,754,833 B1 | 6/2004 | Black |
| 6,836,691 B1 | 12/2004 | Stirton |
| 6,892,236 B1 | 5/2005 | Conrad |
| 6,892,307 B1 | 5/2005 | Wood |
| 6,906,743 B1 | 6/2005 | Maurer |
| 6,920,580 B1 | 7/2005 | Cramer |

(Continued)

OTHER PUBLICATIONS

"Relay Nodes in Wireless Sensor Networks: A Survey"—Ataul Bari, University of Windsor, Nov. 2005, http://richard.myweb.cs.uwindsor.ca/cs510/survey_bari.pdf.

(Continued)

*Primary Examiner* — Hamza N Algibhah
*Assistant Examiner* — Tesfu N Mekonen
(74) *Attorney, Agent, or Firm* — Van Pelt, Yi & James LLP (57) ABSTRACT

Controlling delivery of a video asset to a client is disclosed. A request for a manifest file is received. Manifest file components are retrieved. A dynamic manifest file is assembled from a set of manifest file components.

31 Claims, 3 Drawing Sheets

(56) References Cited

U.S. PATENT DOCUMENTS

| | | |
|---|---|---|
| 6,950,855 B2 | 9/2005 | Sampathkumar |
| 7,006,666 B2 | 2/2006 | Montgomery |
| 7,010,598 B2 | 3/2006 | Sitaraman |
| 7,020,082 B2 | 3/2006 | Bhagavath |
| 7,024,452 B1 | 4/2006 | O'Connell, Jr. |
| 7,024,468 B1 | 4/2006 | Meyer |
| 7,039,694 B2 | 5/2006 | Kampe |
| 7,092,696 B1 | 8/2006 | Hosain |
| 7,139,834 B1 | 11/2006 | Albanese |
| 7,159,234 B1 | 1/2007 | Murphy |
| 7,222,190 B2 | 5/2007 | Klinker |
| 7,277,896 B2 | 10/2007 | Matsubara |
| 7,313,087 B2 | 12/2007 | Patil |
| 7,318,107 B1 | 1/2008 | Menon |
| 7,356,341 B2 | 4/2008 | Nanda |
| 7,367,044 B2 | 4/2008 | Fowler |
| 7,373,415 B1 | 5/2008 | Deshan |
| 7,389,537 B1 | 6/2008 | Callon |
| 7,487,509 B2 | 2/2009 | Hugly |
| 7,490,136 B2 | 2/2009 | Suzuki |
| 7,509,372 B2 | 3/2009 | Dutta |
| 7,519,703 B1 | 4/2009 | Stuart |
| 7,574,488 B2 | 8/2009 | Matsubara |
| 7,593,333 B2 | 9/2009 | Li |
| 7,599,698 B2 | 10/2009 | Cheng |
| 7,620,848 B1 | 11/2009 | Tanner |
| 7,627,872 B2 | 12/2009 | Hebeler |
| 7,668,761 B2 | 2/2010 | Jenkins |
| 7,668,914 B2 | 2/2010 | Parker |
| 7,689,485 B2 | 3/2010 | Kanekar |
| 7,698,460 B2 | 4/2010 | Zhang |
| 7,721,292 B2 | 5/2010 | Frasier |
| 7,725,576 B2 | 5/2010 | Sitaraman |
| 7,813,326 B1 | 10/2010 | Kelm |
| 7,844,491 B1 | 11/2010 | Haitsuka |
| 7,873,727 B2 | 1/2011 | Pal |
| 7,904,580 B2 | 3/2011 | Mandera |
| 7,921,215 B2 | 4/2011 | Dessart |
| 7,921,222 B2 | 4/2011 | Courtemanche |
| 7,930,347 B2 | 4/2011 | Maxwell |
| 7,941,823 B2 | 5/2011 | Hasek |
| 7,969,987 B1 | 6/2011 | Hansen |
| 7,970,402 B2 | 6/2011 | Wu |
| 8,028,159 B2 | 9/2011 | Li |
| 8,038,535 B2 | 10/2011 | Jensen |
| 8,046,765 B2 | 10/2011 | Cherkasova |
| 8,108,403 B2 | 1/2012 | Gopalraj |
| 8,135,855 B2 * | 3/2012 | Sitaraman .............. 709/231 |
| 8,156,204 B2 | 4/2012 | Leblanc |
| 8,182,326 B2 | 5/2012 | Speer, II |
| 8,230,105 B2 | 7/2012 | Melnyk |
| 8,259,597 B1 | 9/2012 | Oak |
| 8,370,887 B2 | 2/2013 | Virdi |
| 8,374,929 B1 | 2/2013 | Lappas |
| 8,387,094 B1 | 2/2013 | Ho |
| 8,417,797 B2 | 4/2013 | Thoen |
| 8,484,319 B2 * | 7/2013 | Wein et al. ............ 709/219 |
| 8,489,683 B2 | 7/2013 | Leblanc |
| 8,489,923 B1 | 7/2013 | Lakshminarayanan |
| 8,589,473 B2 | 11/2013 | Bruss |
| 8,639,553 B1 | 1/2014 | Knauth |
| 8,677,428 B2 * | 3/2014 | Lewis et al. ............ 725/91 |
| 8,683,066 B2 * | 3/2014 | Hurst et al. ............ 709/231 |
| 8,751,605 B1 | 6/2014 | Zhang |
| 8,751,679 B2 * | 6/2014 | McHugh ......... H04N 21/23439 709/219 |
| 8,843,597 B2 | 9/2014 | Leblanc |
| 8,874,725 B1 | 10/2014 | Ganjam |
| 8,874,964 B1 | 10/2014 | Lakshminarayanan |
| 8,898,338 B1 | 11/2014 | McGowan |
| 8,924,996 B2 * | 12/2014 | Shafiee ............... H04N 21/812 705/14.4 |
| 8,930,991 B2 * | 1/2015 | Philpott et al. ............ 725/35 |
| 8,943,170 B2 | 1/2015 | Li |
| 8,954,491 B1 | 2/2015 | Medved |
| 9,100,288 B1 | 8/2015 | Ganjam |
| 9,356,821 B1 | 5/2016 | Jagannathan |
| 9,456,015 B2 | 9/2016 | Chen |
| 9,549,043 B1 | 1/2017 | Stoica |
| 9,613,042 B1 | 4/2017 | Joseph |
| 9,819,566 B1 | 11/2017 | Ganjam |
| 2002/0002708 A1 | 1/2002 | Arye |
| 2002/0016831 A1 | 2/2002 | Peled |
| 2002/0082730 A1 | 6/2002 | Capps |
| 2002/0095400 A1 | 7/2002 | Johnson |
| 2002/0126135 A1 | 9/2002 | Ball |
| 2002/0143798 A1 | 10/2002 | Lisiecki |
| 2002/0175934 A1 | 11/2002 | Hand |
| 2002/0183972 A1 | 12/2002 | Enck |
| 2002/0184357 A1 | 12/2002 | Traversat |
| 2002/0198984 A1 | 12/2002 | Goldstein |
| 2003/0046383 A1 | 3/2003 | Lee |
| 2003/0046396 A1 | 3/2003 | Richter |
| 2003/0046704 A1 | 3/2003 | Laksono |
| 2003/0046708 A1 | 3/2003 | Jutzi |
| 2003/0050966 A1 | 3/2003 | Dutta |
| 2003/0051051 A1 | 3/2003 | O'Neal |
| 2003/0061305 A1 | 3/2003 | Copley |
| 2003/0065739 A1 | 4/2003 | Shnier |
| 2003/0065763 A1 | 4/2003 | Swildens |
| 2003/0074142 A1 | 4/2003 | Steeg |
| 2003/0084003 A1 | 5/2003 | Pinkas |
| 2003/0105850 A1 | 6/2003 | Lean |
| 2003/0135593 A1 | 7/2003 | Lee |
| 2003/0140108 A1 | 7/2003 | Sampathkumar |
| 2003/0140180 A1 | 7/2003 | Brown |
| 2003/0145066 A1 | 7/2003 | Okada |
| 2003/0169863 A1 | 9/2003 | Hernandez |
| 2003/0204613 A1 * | 10/2003 | Hudson et al. ............ 709/231 |
| 2004/0010544 A1 | 1/2004 | Slater |
| 2004/0019675 A1 | 1/2004 | Hebeler |
| 2004/0047354 A1 | 3/2004 | Slater |
| 2004/0049793 A1 | 3/2004 | Chou |
| 2004/0057420 A1 | 3/2004 | Curcio |
| 2004/0064556 A1 | 4/2004 | Zhang |
| 2004/0088347 A1 | 5/2004 | Yeager |
| 2004/0093155 A1 | 5/2004 | Simonds |
| 2004/0107387 A1 | 6/2004 | Larsson |
| 2004/0128682 A1 | 7/2004 | Liga |
| 2004/0133471 A1 | 7/2004 | Pisaris-Henderson |
| 2004/0136327 A1 | 7/2004 | Sitaraman |
| 2004/0158643 A1 | 8/2004 | Suzuki |
| 2004/0162901 A1 | 8/2004 | Mangipudi |
| 2004/0187159 A1 | 9/2004 | Gaydos |
| 2004/0233918 A1 | 11/2004 | Larsson |
| 2004/0236846 A1 | 11/2004 | Alvarez |
| 2004/0267691 A1 | 12/2004 | Vasudeva |
| 2005/0010915 A1 | 1/2005 | Chen |
| 2005/0021715 A1 | 1/2005 | Dugatkin |
| 2005/0060158 A1 | 3/2005 | Endo |
| 2005/0076104 A1 | 4/2005 | Liskov |
| 2005/0086300 A1 | 4/2005 | Yeager |
| 2005/0086469 A1 | 4/2005 | Dunagan |
| 2005/0120131 A1 | 6/2005 | Allen |
| 2005/0169179 A1 | 8/2005 | Antal |
| 2005/0183120 A1 | 8/2005 | Jain |
| 2005/0243735 A1 | 11/2005 | Kashima |
| 2005/0251835 A1 | 11/2005 | Scott |
| 2005/0278259 A1 | 12/2005 | Gunaseelan |
| 2006/0052100 A1 | 3/2006 | Almgren |
| 2006/0059248 A1 | 3/2006 | Ikeda |
| 2006/0075094 A1 | 4/2006 | Wen |
| 2006/0085246 A1 | 4/2006 | Li |
| 2006/0123080 A1 | 6/2006 | Baudino |
| 2006/0135172 A1 | 6/2006 | Dronne |
| 2006/0136218 A1 | 6/2006 | Lee |
| 2006/0136597 A1 | 6/2006 | Shabtai |
| 2006/0168304 A1 | 7/2006 | Bauer |
| 2006/0179154 A1 | 8/2006 | Sitaraman |
| 2006/0190615 A1 | 8/2006 | Panwar |
| 2006/0206539 A1 | 9/2006 | Thompson |
| 2006/0236017 A1 | 10/2006 | Rooholamini |
| 2006/0246880 A1 | 11/2006 | Baldwin |
| 2006/0259949 A1 | 11/2006 | Schaefer |

(56) References Cited

U.S. PATENT DOCUMENTS

| | | |
|---|---|---|
| 2006/0285489 A1 | 12/2006 | Francisco |
| 2007/0005809 A1 | 1/2007 | Kobayashi |
| 2007/0025381 A1 | 2/2007 | Feng |
| 2007/0041584 A1* | 2/2007 | O'Connor et al. ............. 380/45 |
| 2007/0066403 A1 | 3/2007 | Conkwright |
| 2007/0101202 A1 | 5/2007 | Garbow |
| 2007/0136311 A1 | 6/2007 | Kasten |
| 2007/0140113 A1 | 6/2007 | Gemelos |
| 2007/0150612 A1 | 6/2007 | Chaney |
| 2007/0183427 A1 | 8/2007 | Nylander |
| 2007/0198413 A1 | 8/2007 | Nagao |
| 2007/0204011 A1 | 8/2007 | Shaver |
| 2007/0232332 A1 | 10/2007 | Holur |
| 2007/0250560 A1* | 10/2007 | Wein et al. .................. 709/201 |
| 2007/0282994 A1 | 12/2007 | Beers |
| 2007/0286351 A1 | 12/2007 | Ethier |
| 2007/0288638 A1 | 12/2007 | Vuong |
| 2008/0016205 A1 | 1/2008 | Svendsen |
| 2008/0037438 A1 | 2/2008 | Twiss |
| 2008/0046499 A1 | 2/2008 | Cabrera |
| 2008/0046777 A1 | 2/2008 | Chen |
| 2008/0049616 A1 | 2/2008 | Kamath |
| 2008/0049786 A1 | 2/2008 | Ram |
| 2008/0063195 A1 | 3/2008 | Li |
| 2008/0096562 A1 | 4/2008 | Wu |
| 2008/0104454 A1 | 5/2008 | White |
| 2008/0112315 A1 | 5/2008 | Hu |
| 2008/0140688 A1 | 6/2008 | Clayton |
| 2008/0141131 A1 | 6/2008 | Cerny |
| 2008/0144513 A1 | 6/2008 | Small |
| 2008/0151821 A1 | 6/2008 | Cho |
| 2008/0155586 A1 | 6/2008 | Yang |
| 2008/0195461 A1 | 8/2008 | Li |
| 2008/0209499 A1 | 8/2008 | Ramesh |
| 2008/0215718 A1 | 9/2008 | Stolorz |
| 2008/0235746 A1 | 9/2008 | Peters |
| 2008/0247326 A1 | 10/2008 | Cormier |
| 2008/0263180 A1 | 10/2008 | Hurst |
| 2008/0305801 A1 | 12/2008 | Burgess |
| 2008/0313040 A1 | 12/2008 | Rose |
| 2009/0010155 A1 | 1/2009 | Liu |
| 2009/0019503 A1 | 1/2009 | Vorbau |
| 2009/0043906 A1 | 2/2009 | Hurst |
| 2009/0059812 A1 | 3/2009 | Chinnaswamy |
| 2009/0082020 A1 | 3/2009 | Ch'ng |
| 2009/0083631 A1 | 3/2009 | Sidi |
| 2009/0106392 A1 | 4/2009 | Zuckerman |
| 2009/0117893 A1 | 5/2009 | Weigand |
| 2009/0119722 A1 | 5/2009 | Versteeg |
| 2009/0125625 A1 | 5/2009 | Shim |
| 2009/0150487 A1 | 6/2009 | Wolfish |
| 2009/0164656 A1 | 6/2009 | Guan |
| 2009/0172200 A1 | 7/2009 | Morrison |
| 2009/0187956 A1 | 7/2009 | Sommer |
| 2009/0192929 A1 | 7/2009 | Hoeflinger |
| 2009/0234940 A1 | 9/2009 | Pal |
| 2009/0248872 A1 | 10/2009 | Luzzatti |
| 2009/0271101 A1 | 10/2009 | Relyea |
| 2009/0327489 A1 | 12/2009 | Swildens |
| 2009/0328124 A1 | 12/2009 | Khouzam |
| 2010/0043014 A1 | 2/2010 | Hebeler, Jr. |
| 2010/0080290 A1 | 4/2010 | Mehrotra |
| 2010/0088373 A1 | 4/2010 | Pinkham |
| 2010/0100635 A1 | 4/2010 | Takemura |
| 2010/0114562 A1 | 5/2010 | Hutchinson |
| 2010/0125675 A1 | 5/2010 | Richardson |
| 2010/0131642 A1 | 5/2010 | Chalikouras |
| 2010/0138273 A1 | 6/2010 | Bateni |
| 2010/0161729 A1 | 6/2010 | Leblanc |
| 2010/0169195 A1 | 7/2010 | Trest |
| 2010/0235503 A1 | 9/2010 | Sitaraman |
| 2010/0241701 A1* | 9/2010 | Lester et al. .................. 709/203 |
| 2010/0302002 A1 | 12/2010 | Guo |
| 2010/0306368 A1 | 12/2010 | Gagliardi |
| 2011/0014972 A1 | 1/2011 | Herrmann |
| 2011/0016225 A1 | 1/2011 | Park |
| 2011/0047413 A1 | 2/2011 | McGill |
| 2011/0058675 A1* | 3/2011 | Brueck et al. ................ 380/277 |
| 2011/0060649 A1 | 3/2011 | Dunk |
| 2011/0082946 A1 | 4/2011 | Gopalakrishnan |
| 2011/0179435 A1 | 7/2011 | Cordray |
| 2011/0196943 A1 | 8/2011 | Bornstein |
| 2011/0258049 A1 | 10/2011 | Ramer |
| 2011/0296048 A1* | 12/2011 | Knox et al. .................. 709/231 |
| 2011/0314130 A1* | 12/2011 | Strasman ..................... 709/219 |
| 2012/0007866 A1 | 1/2012 | Tahan |
| 2012/0047542 A1 | 2/2012 | Lewis et al. |
| 2012/0093098 A1 | 4/2012 | Charbit |
| 2012/0110167 A1 | 5/2012 | Joch |
| 2012/0124179 A1 | 5/2012 | Cappio |
| 2012/0178426 A1 | 7/2012 | Filipov |
| 2012/0198492 A1 | 8/2012 | Dhruv et al. |
| 2012/0204068 A1 | 8/2012 | Ye |
| 2012/0209717 A1 | 8/2012 | Henry |
| 2012/0226734 A1 | 9/2012 | Poese |
| 2012/0231885 A1 | 9/2012 | Speer, II |
| 2012/0240176 A1 | 9/2012 | Ma |
| 2012/0278496 A1 | 11/2012 | Hsu |
| 2013/0067052 A1 | 3/2013 | Reynolds |
| 2013/0067109 A1 | 3/2013 | Dong et al. |
| 2013/0091249 A1 | 4/2013 | McHugh |
| 2013/0094445 A1 | 4/2013 | De Foy |
| 2013/0124724 A1 | 5/2013 | Madgwick |
| 2013/0132605 A1 | 5/2013 | Kocks |
| 2013/0142129 A1 | 6/2013 | Rinne |
| 2013/0151673 A1 | 6/2013 | Gouache |
| 2013/0151687 A1 | 6/2013 | Mooneyham |
| 2013/0159531 A1 | 6/2013 | Katyal |
| 2013/0305299 A1 | 11/2013 | Bergstrom |
| 2013/0326024 A1 | 12/2013 | Chen |
| 2014/0108671 A1 | 4/2014 | Watson |
| 2014/0149557 A1* | 5/2014 | Lohmar ............... H04L 65/605 709/219 |
| 2014/0150046 A1 | 5/2014 | Epstein |
| 2014/0198641 A1 | 7/2014 | Perkuhn |
| 2014/0245359 A1 | 8/2014 | De Foy |
| 2014/0330980 A1 | 11/2014 | Richardson |
| 2014/0348049 A1 | 11/2014 | Kim |
| 2015/0026239 A1 | 1/2015 | Hofmann |
| 2015/0334153 A1 | 11/2015 | Koster |

OTHER PUBLICATIONS

"Simple Opportunistic Routing Protocol for Wireless Mesh Networks"—Rozner et al, University of Texas at Austin, Aug. 2011 http://ericrozner.com/papers/wimesh06.pdf.

Elo et al., "Virtual URLs for Browsing & Searching Large Information Spaces", WebNet Journal, pp. 38-43, p. 66, Jan.-Mar. 1999. http://www.cs.berkeley.edu/~kubitron/articles/techreview.pdf "The Internet Reborn"—Wade Roush, Technology Review, Oct. 2003.

Theotokis et al., A Survey of Peer-to-Peer Content Distribution Technologies, ACM Computing Surveys, vol. 36, No. 4, Dec. 2004, pp. 335-371.

Wade Roush, Technology Review, Published by MIT, TR10: Peering into Video's Future, Mar. 12, 2007, http://technologyreview.com/printer_friendly_article.aspx?id=18284.

"Firefly-Inspired Heartbeat Synchronization in Overlay Networks"—Binci et al., University of Bologna, Italy, Feb. 2007 http://www.cs.unibo.it/babaoglu/courses/cas06-07/papers/pdf/fireflies.pdf.

* cited by examiner

```
#EXTM3U
#EXT-X-TARGETDURATION:10
#EXT-X-MEDIA-SEQUENCE:0
#EXTINF:10, no desc
http://cdnA.com/MyFavoriteVideo500Kbps_0.ts
#EXTINF:10, no desc
http://cdnA.com/MyFavoriteVideo500Kbps_1.ts
#EXTINF:10, no desc
http://cdnA.com/MyFavoriteVideo500Kbps_2.ts
#EXTINF:10, no desc
http://cdnA.com/MyFavoriteVideo3.ts
#EXT-X-ENDLIST
```

FIG. 3A

```
#EXTM3U
#EXT-X-TARGETDURATION:10
#EXT-X-MEDIA-SEQUENCE:0
#EXTINF:10, no desc
http://cdnB.com/MyFavoriteVideo2000Kbps_0.ts
#EXTINF:10, no desc
http://cdnB.com/MyFavoriteVideo2000Kbps_1.ts
#EXTINF:10, no desc
http://cdnB.com/MyFavoriteVideo2000Kbps_2.ts
#EXTINF:10, no desc
http://cdnB.com/MyFavoriteVideo2000Kbps_3.ts
#EXT-X-ENDLIST
```

DYNAMIC GENERATION OF VIDEO MANIFEST FILES

CROSS REFERENCE TO OTHER APPLICATIONS

This application claims priority to U.S. Provisional Patent Application No. 61/621,973 entitled DYNAMIC GENERATION OF VIDEO MANIFEST FILES filed Apr. 9, 2012, which is incorporated herein by reference for all purposes.

BACKGROUND OF THE INVENTION

Users are increasingly using networks such as the Internet to access content, such as video files and live streaming/video on demand content, via client machines. As demand for such content increases, there are challenges in distributing that content effectively and with high quality.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
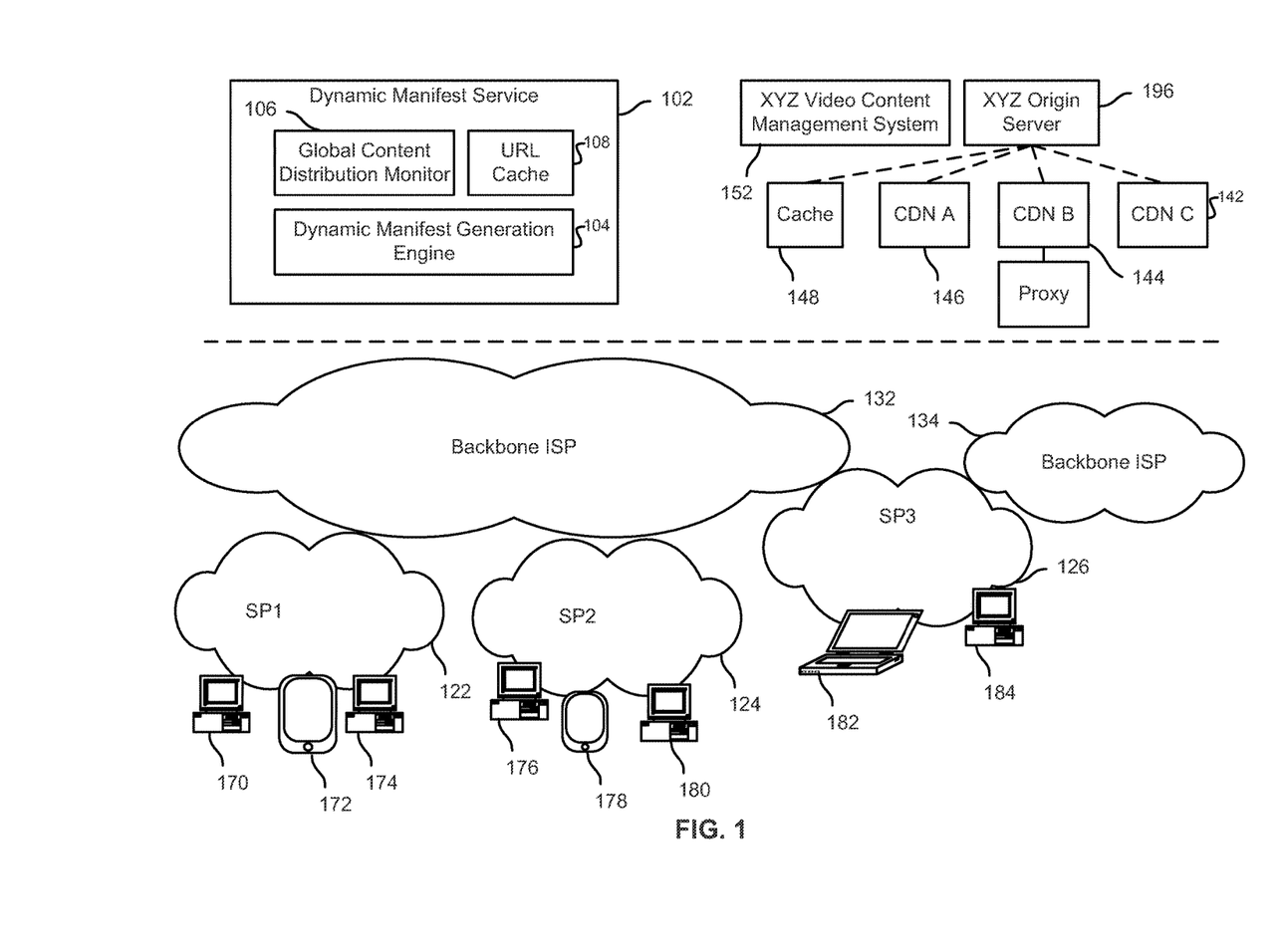
FIG. 1 is an illustration of an environment in which content is distributed.

FIG. 1 is an illustration of an environment in which content is distributed. In the example shown, clients 170-184 are used to access content, such as audiovisual content (e.g., movies, songs, television shows, sporting events, games, or any other appropriate asset) that is owned by content owners. The content assets are managed by video content management systems (152) (which can be part of an online video platform), stored (or captured) at origin servers (196), then distributed via other servers, caches, content distribution networks (CDNs), proxies, etc. (collectively, "content sources"). Content sources employ a variety of technologies and include HTTP, Adobe Flash, Apple HTTP Live Streaming (HLS), and Microsoft Internet Information Service servers.

Examples of clients include personal computers (170), laptops (182), cellular phones/personal digital assistants/tablets/mobile device (178), and other types of information appliances (not shown) such as set-top boxes, game consoles, broadband routers, file servers, video servers, and digital video recorders as applicable. The clients shown are used by subscribers to various Internet service providers (ISPs). For example, clients 170, 172, and 174 are subscribed to SP1 (122) while clients 176, 178, and 180 are subscribed to SP2 (124), and clients 182 and 184 are subscribed to SP3 (126).

In the example shown, a television network ("XYZ") has contracted with content distributors 142-146 to provide viewers with access to live streams of its broadcasts as well as streams of television show episodes and sporting events. In some cases, the content distributor is owned/operated by the content owner.

Content distributor 142 has a data center that is provided with network access by backbone ISP 132. Though represented here by a single node (also referred to herein as a "CDN node"), content distributor may typically have multiple data centers (not shown) and may make use of multiple backbone or other ISPs. Content distributor 144 has a data center that is provided with network access by backbone ISP 134. Advertisements can also be served to clients via ad servers (not shown).

Content can be delivered/provided to clients based on various protocols. As one example, online video can be delivered to a client via chunk-based protocols, in which a video player on a client fetches a manifest (e.g., metadata configuration) file that lists a sequence of location information (e.g., HTTP URLs) pointing to chunks/segments of video content (e.g., 2-10 second ".ts" transport segment chunks stored on the CDNs) that together constitute a full video (e.g., television show). The video player can then fetch the chunks/segments/components one by one according to the manifest file, which indicates how the chunks can be retrieved from the CDNs so that they can be stitched together by the client media player to render the video asset as a smooth stream.

In the example shown, video content management system 152 is used by television network XYZ to manage its media assets. Continuing with the example of a chunk-based protocol for online video delivery, prior to a video asset being made available (e.g., available for a user of a client to stream) and as part of the publishing workflow, the video content management system can convert (e.g., compress, transcode, encode, etc.) a raw video asset owned by the content owner into a set of video chunks/segment that together constitute the full video asset. The video content management system then publishes the generated chunks to the various CDNs, and generates corresponding static manifest files on a per video asset basis that can be followed/executed by a client media player to play the video asset. The generated manifest files can then be deployed/published along with the video data files on the various CDNs. In some cases, the CDNs themselves generate chunks and corresponding manifest files. Multiple versions of a video asset encoded at different bitrates can be published to the CDNs, using the chunk-based protocol, with corresponding manifest files generated as well.

The deployed manifest files can be of two types. In a first type of manifest file, the manifest file is associated with a particular CDN for chunks encoded at a particular bitrate (which corresponds to resolution). For example, a first manifest file can be generated listing URLs pointing to all video chunks on a particular CDN constituting a full video encoded at 2000kbps, while a second manifest file can be pre-generated by a video content management system listing URLs pointing to all video chunks on the CDN constituting the same video encoded at 300kbps. In a second type of manifest file, the generated manifest file contains a list of URLs pointing to different sub-manifest files, each of which corresponds to one particular bitrate and one particular server/CDN. For example, CDN C (142) can have deployed a master, top-level manifest file for the CDN that specifies URLs to sub-manifest files that list URLs pointing chunks at one particular bitrate on CDN C.

While the two types of manifest files described above can be used directly by a video player to stream online video, the manifest files deployed by network XYZ (or other content owners) may be static and face certain restrictions. For example, in the first type described above (in which the manifest file may contain a list of components that are URLs to chunks at one particular bitrate on one particular server/CDN), if a video player were to play a video according to this first type of manifest file, the video player would not be able to change the bitrate of the video or the CDN to improve video quality, as it is not aware of other bitrate/CDN choices that are available for playing the same video. In the second type of static manifest file (in which the manifest file may contain a list of components that are URLs to sub-manifest files, each of which corresponds to one particular bitrate and one particular server/CDN), in this case, the video player could potentially change bitrate/CDN by downloading chunks from a different sub-manifest file. While the video player could, for example, decide to lower the bitrate if it detects that its available bandwidth has decreased, or decide to download chunks from a different CDN if it experiences a connection error when talking to the current CDN, this approach may be limited due to the video player only being configured to rely on local information, which may not allow for an optimal decision of bitrate/CDN given the current global state of content distribution. An example of a static manifest file will be provided below.

As the bandwidth available to the video player and the performance of content sources (e.g., CDNs) involved in the delivery of the video chunks can vary significantly while the video is playing, dynamic adjustment of the video bitrate and CDN can be utilized to optimize the viewing experience for the user, such that smooth playback (e.g., without stuttering, buffering, visual artifacts, etc.) can be ensured. A dynamic manifest backend service (102) can be used to perform the dynamic adjustment by leveraging the information/components/contents of the static manifest files as well as real-time monitored/mapped global performance/policy information to assemble dynamic manifest files customized for a particular client in real-time (e.g., for the client at a particular time, in a particular geography, on a particular device). An example of a dynamically assembled manifest file will be provided below.

Suppose a user of client 172 (hereinafter "Alice") would like to watch a show owned by XYZ. Client 172 is a table that includes an application for accessing various shows owned by XYZ. Alice opens up the application and selects the show she would like to watch. Her request for the game is directed to the video content management system associated with XYZ. Instead of directing Alice (e.g., via a URL) to a static manifest file previously published by XYZ's video content management system and deployed on a particular CDN, which may be used as a default standard manifest file, the video player is instead directed by the video content management system to request a manifest file from the dynamic manifest service 102. The redirected request from Alice's client can include status/historical/performance information such as the URL of the original default standard static manifest file, the device type of Alice's client, the type of content being requested, a current and historical bandwidth estimate at the client, a history of bitrates of prior videos played by a video player at the client, a history of CDNs for prior videos, geographical information associated with the device (e.g., country, state, city, Autonomous System Number (ASN), etc.), a device identifier identifying the specific device, device resources (e.g., available memory, CPU), content length (e.g., short form and long form video on demand, live content, etc.), quality of service (QoS) information on video playback, or any other appropriate client attribute information. The information included in the request from Alice's client can be collected and processed by global content distribution monitor 106, which also collects, aggregates, and processes information from other clients as well. The global content distribution monitor can also be configured to monitor information associated with CDNs, such as whether they are down, undergoing maintenance, are having bandwidth issues, etc. Network traffic information (e.g., congestion, available bandwidth of links, etc.) associated with ISPs and network links can also be monitored by the global content distribution monitor. The collected information can be made available and used in real-time to assemble a global content distribution map of the state of the distribution network. This global view can be used to assemble dynamic manifest files in real-time, on-the-fly, and that are customized to Alice's client, as will be described in more detail below.

Based on the request, the dynamic manifest service can then fetch the contents/components (e.g., URLs to chunks or sub-manifest files) of the original default standard static manifest file (e.g., default for the type of video player), and use the standard static manifest file as a starting point, in which the manifests file's contents are dynamically overwritten to specify the combination of bitrate and CDN/server chunks that can provide the optimal video quality to Alice's requesting client. In some embodiments, a new manifest file is dynamically generated. The selection/calculation (e.g., by dynamic manifest generation engine 104) of appropriate (e.g., optimal) bitrate/CDN chunks can be based on the attributes sent by the video player in the request, as described above, as well as other aggregated global information. For example, optimal bitrates/CDNs can be determined based on information that the video player is running on an iPad in San Francisco on the Comcast ISP network. The selection can also be based on global distribution information (e.g., current global state of content distribution) about current network conditions aggregated from other video players, as described above. For example, using the global distribution map, it can be determined that a large number of iPad video players on CDN A have been experiencing high buffering (and hence poor video quality) on Comcast and ATT ISP networks in San Francisco during the last 35 minutes. Thus, based on the global network information, CDN B can be determined as the best choice for iPad video players in San Francisco on Comcast or AT&T. The selection of the appropriate bitrate/CDN chunks can also be determined based on traffic and business policies. For example, television network XYZ can specify that 60% of traffic on a particular device in a particular location should go to CDN A, while the remaining 40% should go to CDN B. This can allow for fine grain policy control. As another example, XYZ or a CDN may dictate that all viewers should currently play a lower bitrate than what they are normally capable of because the network is currently undergoing maintenance or high congestion. As another example, XYZ may dictate that certain devices (e.g., iOS devices) can only stream from a particular CDN, as that CDN provides better support for the type of device. In some embodiments, location information from Alice's video player that is gathered via a separate communication channel than the request (e.g., via an agent running on Alice's client) can periodically update the dynamic manifest service with information about its local state (e.g., current bandwidth, whether the user is playing in full screen mode, etc.) through an independent communication channel.

In some embodiments, the specified manifest file components are selected from a repository (e.g., URL cache 108) of stored manifest file components (e.g., URLs of chunks, URLs of sub-manifest files, etc.). The stored manifest file components can then be mixed and matched in dynamically assembling (e.g., using dynamic manifest generation engine 104) manifest files that provide chunks of optimal bitrates/CDNs (or even servers with a CDN, e.g., intra-CDN) for a given client based on various criteria, such as global performance and distribution information. The repository can be populated with manifest file components by scraping/harvesting manifest file components from the various static manifest files deployed on various CDNs of various bitrates. For example, static manifest files can be downloaded from the CDNs that they are deployed on and subsequently read to determine the URLs (or other appropriate manifest components) contained in the static manifest file. Additionally, URL cache 108 can also be refreshed periodically (or asynchronously triggered) to request new manifest files (with new manifest file components) in order to populate the URL cache with new manifest file components, or to purge (e.g., via purge notification from video content management system or other purge mechanism to invalidate/purge cache e.g., for a particular asset) manifest file components that are no longer available so that the repository can be kept fresh and up-to-date. For example, the manifest files deployed by a CDN or a publisher can change due to problems arising (e.g., error in chunk transcoding) and new information can be re-fetched.

Using the retrieved manifest file components, dynamic manifest generation engine 104 can then generate manifest files that contain a dynamically assembled flattened mix of URLs to chunks of various bitrates and CDNs/servers (e.g., chunks at 200kbps and 2000kbps from CDN A and B), or a dynamically assembled mix of URLs to various sub-manifest files stored on various CDNs/servers (e.g., so that Alice's video player can switch between CDNs). In some embodiments, rather than overwriting an existing manifest file, a new manifest file is dynamically assembled from the pool of available, candidate manifest file components.

Dynamically assembling a manifest file can include editing the content of a manifest file (e.g., adding, replacing, removing, etc. lines of manifest file component URLs). The overwritten/dynamically generated/assembled manifest file can then be sent/provided to Alice's video player.

Thus, by fetching chunks according to the dynamically assembled manifest file, Alice's client can be provided access to chunk bitrates and CDNs that it would not otherwise have had access to if using static manifest files in order to effect changes/switches in bitrates/CDNs that may allow for a better viewing experience or to enforce policy control. Additionally, as the dynamic manifest service has acted as a proxy in delivering a dynamic manifest file that Alice's video player is already configured to process/follow, the bitrate/CDN of chunks played by a client video player can be controlled/enforced by the dynamic manifest service without requiring the video player to expose a new API, or introducing new functionality, thus allowing the video player software to remain unmodified.

In the example shown, dynamic manifest service 102 is deployed/integrated into the online video delivery infrastructure as a third party service. However, the dynamic manifest service can be deployed/integrated at other points, such as the same device as the video player, on the video content management system, on a CDN origin or edge servers, etc.

In the case that the dynamic manifest service is deployed at the same device of the video player, the dynamic manifest service can run as a local proxy on the device, controlling the data for a particular asset that is provided to the video player on the same device. For example, after determining the appropriate bitrates/CDNs for chunks to be played by the video player (e.g., using information in a local URL cache), which may include future chunks to be played ahead of where the current video playhead is at, the dynamic manifest service can look ahead and pre-fetch/download the determined future chunks and store them in a local cache component on the device. The dynamic manifest service, as a local proxy, then generates a dynamic manifest file; however, instead of including the URLs for the data chunks on the CDNs, the URL manifest file components (HTTP requests) are overwritten to point to the localhost as the host name, so that the pre-fetched chunks stored in the local component are retrieved for playback by the video player. This can allow for a more seamless playback experience, for example, when transitioning between video data chunk segments that originally came from different CDNs.

Figure 2:
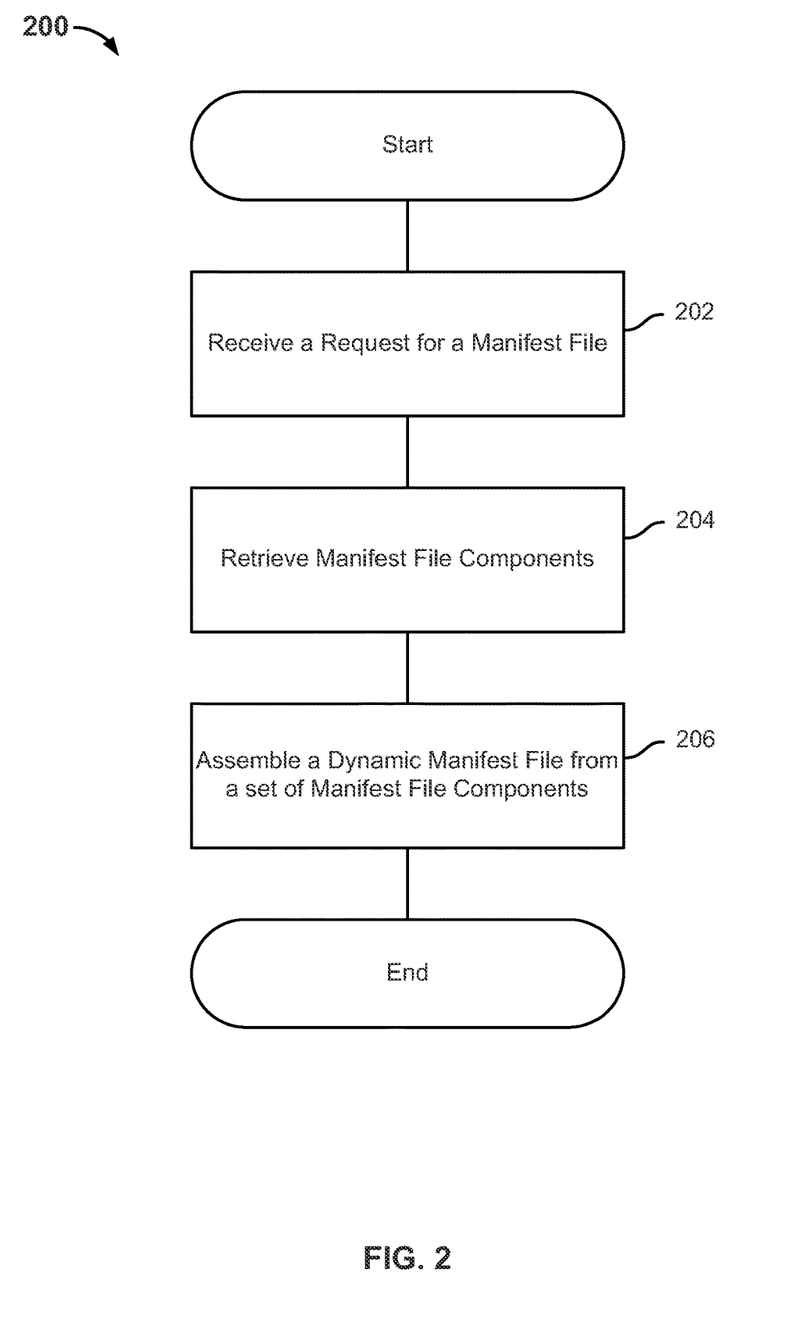
FIG. 2 is a flow diagram illustrating an embodiment of a process for controlling delivery of a video to a client.

FIG. 2 is a flow diagram illustrating an embodiment of a process for controlling delivery of a video to a client. In some embodiments, process 200 is executed by dynamic manifest service 102 of FIG. 1. The process begins at 202 when a request for a manifest file is received. The request for a manifest file may be received from a video player that has been redirected after requesting a manifest file from a video content management system. The redirected request can include information such as the location (e.g., URL) of the original manifest file provided by the video content management system, the video asset of interest, as well as client attribute information, such as the type of device the video player is on, the type of content of interest, content length (e.g., short/long form video on demand, live, etc.), a current and historical bandwidth estimate of the client, a bitrate history from prior playback of content, a history of CDNs from which prior data chunks were received, geographical information (e.g., country, state, city, ASN), device resources (e.g., available memory, CPU), etc.

At 204, manifest file components are retrieved. As described above, in various embodiments, manifest file components include location information (e.g., HTTP URLs) for retrieving chunks of various bitrates and CDNs, sub-manifest files, manifest files, etc. from content sources such as CDNs. In some embodiments, the manifest file components are retrieved from a repository of stored/cached manifest file components. The manifest file components included in the repository were included, for example, by evaluating existing static manifest files, which can be downloaded from CDNs and scraped to retrieve their contents and any other appropriate manifest file component. The retrieved manifest file components are then stored, for example, in the URL cache. In some embodiments, if the URL cache is stored locally on the same device as the video player (e.g., dynamic manifest service runs as a local proxy), the retrieved manifest file components (e.g., URLs) are translated/overwritten to point to chunks that have been pre-fetched by the video player (and also stored locally), for example, by using a localhost address. Additionally, the URL cache can be periodically refreshed by re-fetching manifest file components. In some embodiments, the refresh is performed asynchronously, or can be triggered based on changes to manifest file components (e.g., CDN goes offline, change in chunk data provided by content publisher, etc.). In some cases, the cache/repository of manifest file components can also be purged (e.g., via a purge notification) to remove stale manifest file components (e.g., that are no longer valid).

At 206, a dynamic manifest file is assembled from a set of manifest file components. The set of manifest file components to be included in the dynamic manifest file can be selected from a plurality of candidate manifest file components, such as those stored in URL cache 108. The selection can be based on selection criteria. As described above, selection/calculation of the optimal bitrate/CDN for data chunks can be based on attributes sent by the video player in the request, global information about current network conditions aggregated from other video players, traffic information, business policies, local information for the video player that may be gathered via a communication channel separate from the request, or any other appropriate selection criteria. A manifest file is then dynamically assembled using the calculated/selected manifest file components. In some embodiments, an existing manifest file can be dynamically overwritten. For example, if an original manifest file was included in the received request, the original manifest file can be downloaded and its contents edited (e.g., adding/deleting/modifying lines of manifest file components). In some embodiments, a new manifest file appropriate for the requesting video player is dynamically created. In some embodiments, a partial dynamic manifest file can be created to allow for mid-stream switching, which will be described in more detail below. The dynamic manifest file is then sent to the requesting video player. In some embodiments, the dynamically assembled manifest file, when followed/executed by the video player, causes the video player to implicitly effect a switch between data chunks of different bitrates/CDNs by directing the video player to fetch data chunks of various bitrates/CDNs selected using the criteria described above.

Several scenarios in which delivery of content to a client is controlled via dynamically assembled manifest files are provided below.

Example Scenario: Selecting an optimal start-time bitrate/CDN

In this example, a dynamic manifest service is used to determine the best available bitrate/CDN for Alice's video player to begin playing content at. Although the Apple HLS protocol is used in this example, any appropriate protocol can be applied.

Figure 3A:
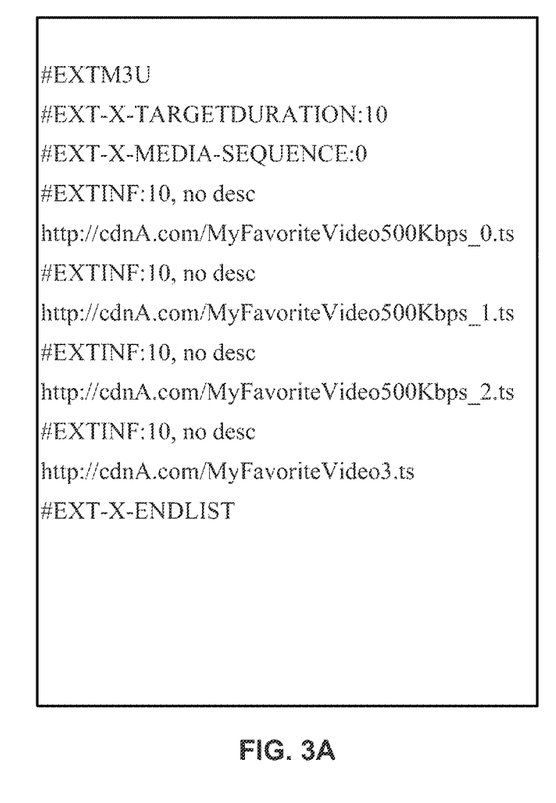
FIG. 3A is a diagram illustrating an embodiment of a static manifest file.
Figure 3B:
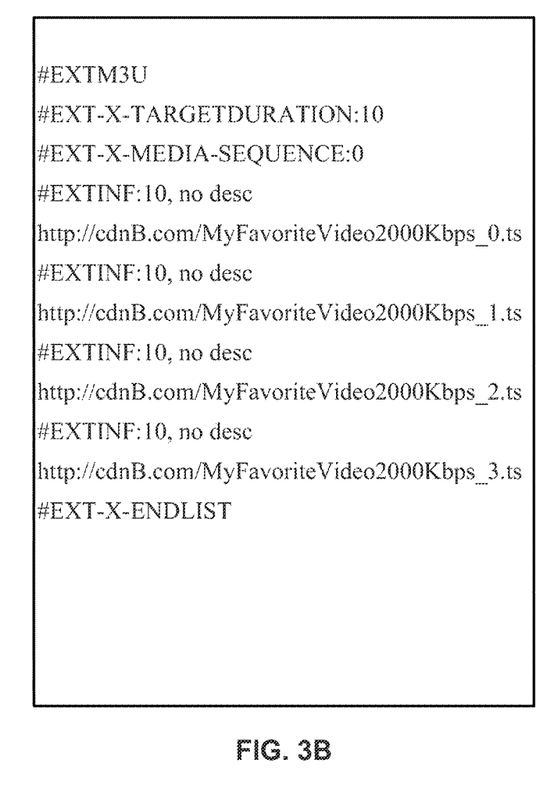
FIG. 3B is a diagram illustrating an embodiment of a dynamically generated manifest file.

Alice's client's video player, after being directed to the dynamic manifest service by XYZ's video content management system, requests the original static manifest file MyFavoriteVideo.m3u8 from the dynamic manifest service using the standard HTTP protocol as follows:

HTTP GET
   http://Best Quality Video Corp.com/
      DynarnicManfest?originalUrl=http%3A %2F%
      2FcdnA.com %2FMyFavoriteVideo.
      m3u8&city=SanFrancisco&lastBandwidthMe
      asurement=3000Kbps&deviceType=iPad&contentType=
      VoD&isp=Comcast As shown, the http get request specifies the location of the dynamic manifest service (BestQualityVideoCorp.com), the URL for original default static HLS manifest file (on CDN A), the content of interest, the content type (video on demand) as well as various client attribute information (that may have been included in the initial session request from the client) such as the device type (iPad), ISP (Comcast), last bandwidth that content was played at, etc. The dynamic manifest service proceeds to fetch the default starting static HLS manifest file (shown in FIG. 3A) from http://cdnA-.com/MyFavoriteVideo.m3u8. The dynamic manifest service then calculates the best bitrate/CDN to be used for this particular video session based on the client attribute information as well as global distribution performance information. For example, the dynamic manifest service can decide to use bitrate 2000 Kbps because the request indicated that the video player has previously experienced 3000 Kbps bandwidth. Further, the dynamic manifest service can determine that the best CDN to begin with is CDN B rather than CDN A, as it has been determined that CDN B is currently the best performing CDN for iPads in San Francisco on the Comcast ISP network based on global knowledge aggregated from a large number of video players (e.g., via global content distribution monitor 106). Once the determination of the optimal bitrate/CDN has been made, the original static manifest file is rewritten to include URLs pointing to 2000 Kbps chunks from CDN B. The dynamically rewritten manifest file is shown in FIG. 3B.

Example Scenario: Mid-stream bitrate/CDN switching

In this example, the dynamic manifest service is used to instruct Alice's video player to switch the bitrate/CDN of chunks after video has already begun playing.

When responding to the initial manifest file request from the video player, the dynamic manifest service includes only URLs to the first few video chunks of the show that Alice would like to watch, rather than a full listing of all URLs for all video chunks (which can be at various bitrates/CDNs) constituting the full video. Additionally, the dynamic manifest service omits the End-of-File marker at the end of the manifest file (e.g., removing the #EXT-X-ENDLIST of the manifest file in FIG. 3B). In this case, the chunk-based video player is configured to re-fetch a manifest file which does not have an End-of-File marker when it has finished playing all of the chunks listed in the partial manifest file.

When the video player requests the manifest file again, the dynamic manifest service can lookup internal, per-video player session state information to determine the next chunk to provide the video player. The optimal bitrate and CDN to be used currently are then calculated, and a new (or updated) manifest file is dynamically generated including a next set of URLs (or other appropriate manifest file component) for data chunks at the selected bitrate/CDN. The dynamic manifest service can then update the internal, per video player session state counter that tracks the chunks previously provided to Alice's video player. The new dynamically generated manifest file is sent to Alice's video player, which follows/processes the manifest file to fetch and play the data chunks using the URLs specified in the latest manifest file, thus effecting a mid-stream bitrate and/or CDN switch. This protocol can be applied to both live and on demand video.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for controlling delivery of a video asset to a client, comprising:
    a processor configured to:
        obtain one or more manifest files:
        determined, based at least in part on an evaluation of the obtained one or more manifest files, a plurality of manifest file components, wherein a manifest file component comprises at least one of a reference to a segment of the video asset and a reference to a sub-manifest file;
        store the determined plurality of manifest file components in a repository comprising a plurality of candidate manifest file components;
        receive a request for a manifest file associated with the video asset, wherein the request includes an attribute associated with the client;
        obtain access to the repository including the plurality of candidate manifest file components;
        based at least in part on the attribute associated with the client included in the request, select, from the repository, a subset of the plurality of candidate manifest file components associated with the video asset;
        assemble a dynamic manifest file using the selected subset of the plurality of candidate manifest file components associated with the video asset selected from the repository based at least in part on the attribute associated with the client; and
        provide the assembled dynamic manifest file to the client, wherein the client is configured to obtain segments of the video asset according to the assembled dynamic manifest file; and
    a memory coupled to the processor and configured to provide the processor with instructions.

2. The system of claim 1, wherein the attribute includes geographical information associated with a device associated with the client.

3. The system of claim 1, wherein the attribute includes a device type of a device associated with the client.

4. The system of claim 1, wherein the attribute includes an Internet service provider associated with the client.

5. The system of claim 1, wherein the subset of candidate manifest file components is selected based at least in part on performance information.

6. The system of claim 5, wherein the performance information includes information that has been aggregated from a plurality of content players.

7. The system of claim 1, wherein the subset of candidate manifest file components is selected based at least in part on network traffic.

8. The system of claim 1, wherein the subset of candidate manifest file components is selected based at least in part on a business policy.

9. The system of claim 1, wherein the subset of candidate manifest file components include URLs.

10. The system of claim 1, wherein the dynamic manifest file, when followed by a content player associated with the client, effects a CDN switch.

11. The system of claim 1, wherein the dynamic manifest file, when followed by a content player associated with the client, effects a bitrate switch.

12. The system of claim 1, wherein the dynamic manifest file, when followed by a content player associated with the client, effects an intra-CDN server switch.

13. A method of controlling delivery of a video asset to a client, comprising:
    receiving, from one or more remote sources, one or more manifest files;
    scraping, from the one or more manifest files received from the one or more remote sources, a plurality of manifest file components, wherein at least one scraped manifest file component comprises at least one of a reference to a segment of the video asset and a reference to a sub-manifest file;
    storing the scraped plurality of manifest file components in a repository of candidate manifest file components;
    receiving a request for a manifest file associated with the video asset;
    obtaining access to the repository of candidate manifest file components
    based at least in part on an attribute associated with the client, select, from the repository, a subset of the candidate manifest file components in the repository associated with the video asset;
    assembling a dynamic manifest file using the subset of candidate manifest file components associated with the video asset selected from the repository based at least in part on the attribute associated with the client; and
    providing the assembled dynamic manifest file to the client, wherein the client is configured to obtain segments of the video asset according to the assembled dynamic manifest file.

14. A computer program product for controlling delivery of a video asset to a client the computer program product being embodied in a non-transitory computer readable storage medium and comprising computer instructions for:
    receiving, from one or more remote sources, one or more manifest files;
    scraping, from the one or more manifest files received from the one or more remote sources, a plurality of manifest file components, wherein at least one scraped manifest file component comprises at least one of a reference to a segment of the video asset and a reference to a sub-manifest file;
    storing the scraped plurality of manifest file components in a repository of candidate manifest file components;
    receiving a request for a manifest file associated with the video asset;
    obtaining access to the repository of candidate manifest file components
    based at least in part on an attribute associated with the client, select, from the repository, a subset of the candidate manifest file components in the repository associated with the video asset;
    assembling a dynamic manifest file using the subset of candidate manifest file components associated with the video asset selected from the repository based at least in part on the attribute associated with the client; and providing the assembled dynamic manifest file to the client, wherein the client is configured to obtain segments of the video asset according to the assembled dynamic manifest file.

15. The system of claim 1, wherein the repository comprises a cache including URLs directed to video segments that comprise portions of the video asset.

16. The system of claim 1, wherein the processor is configured to download the one or more manifest files from one or more content delivery networks (CDNs).

17. The system of claim 1, wherein the processor is further configured to refresh the repository at least in part by:
   requesting one or more additional manifest files;
   scraping, from the additional one or more manifest files, a plurality of additional manifest file components; and
   storing the scraped plurality of additional manifest file components in the repository.

18. The method of claim 13, wherein the attribute includes geographical information associated with a device associated with the client.

19. The method of claim 13, wherein the attribute includes a device type of a device associated with the client.

20. The method of claim 13, wherein the attribute includes an Internet service provider associated with the client.

21. The method of claim 13, wherein the subset of candidate manifest file components is selected based at least in part on performance information.

22. The method of claim 21, wherein the performance information includes information that has been aggregated from a plurality of content players.

23. The method of claim 13, wherein the subset of candidate manifest file components is selected based at least in part on network traffic.

24. The method of claim 13, wherein the subset of candidate manifest file components is selected based at least in part on a business policy.

25. The method of claim 13, wherein the subset of candidate manifest file components include URLs.

26. The method of claim 13, wherein the dynamic manifest file, when followed by a content player associated with the client, effects a CDN switch.

27. The method of claim 13, wherein the dynamic manifest file, when followed by a content player associated with the client, effects a bitrate switch.

28. The method of claim 13, wherein the dynamic manifest file, when followed by a content player associated with the client, effects an intra-CDN server switch.

29. The method of claim 13, wherein the repository comprises a cache including URLs directed to video segments that comprise portions of the video asset.

30. The method of claim 13, further comprising downloading the one or more manifest files from one or more content delivery networks (CDNs).

31. The method of claim 13, further comprising refreshing the repository at least in part by:
   requesting one or more additional manifest files;
   scraping, from the additional one or more manifest files, a plurality of additional manifest file components; and
   storing the scraped plurality of additional manifest file components in the repository.

* * * * *

UNITED STATES PATENT AND TRADEMARK OFFICE
CERTIFICATE OF CORRECTION

PATENT NO. : 10,148,716 B1
APPLICATION NO. : 13/859702
DATED : December 4, 2018
INVENTOR(S) : Joseph et al.

Page 1 of 1

It is certified that error appears in the above-identified patent and that said Letters Patent is hereby corrected as shown below:

In the Claims

In Column 10, Claim 13, Line 31, after "file components" insert --;--.

In Column 10, Claim 14, Line 61, after "file components" insert --;--.

Signed and Sealed this
Fourteenth Day of April, 2020

Andrei Iancu
*Director of the United States Patent and Trademark Office*